United States Patent [19]

Kakefuda et al.

[11] 3,711,575

[45] Jan. 16, 1973

[54] THREE STAGE EMULSION AND SUSPENSION IN PROCESS FOR PRODUCTION OF IMPACT RESISTANT THERMOPLASTIC RESINS

[75] Inventors: Koiti Kakefuda; Tatsuo Ito, both of Ichihara; Yasuyuki Okano, Hitachi, all of Japan

[73] Assignee: Hitachi Chemical Company, Ltd., Tokyo, Japan

[22] Filed: Jan. 28, 1971

[21] Appl. No.: 110,637

[30] Foreign Application Priority Data
Feb. 6, 1970  Japan..................................45/10035

[52] U.S. Cl. .............260/881, 260/29.6 RB, 260/883
[51] Int. Cl................................................C08f 15/40
[58] Field of Search ....................260/881, 29.6 RB

[56] References Cited

UNITED STATES PATENTS 3,448,173   6/1969   Ryan et al. ............................260/876
3,450,796   6/1969   Griffin................................260/885n Primary Examiner—Murray Tillman
Assistant Examiner—John Seibert
Attorney—Craig, Antonelli & Hill 14 Claims, No Drawings

THREE STAGE EMULSION AND SUSPENSION IN PROCESS FOR PRODUCTION OF IMPACT RESISTANT THERMOPLASTIC RESINS

The present invention relates to a process for producing thermoplastic resins resistant to weathering and impact.

As an impact resistant molding material, there has been known a thermoplastic resin called "ABS resin," made from acrylonitrile, styrene and butadiene as the main components. The ABS resin, however, is not completely satisfactory in weather-resistance, the improvement of which has strongly been desired. Since the unsatisfactory weather-resistance of ABS resin originates mainly from the susceptibility of the butadiene component to the degrading action of oxygen or ultraviolet rays, there have been made various attempts to substitute for the butadiene component other rubber-like materials that are more weather-resistant. The present inventors disclosed in Japanese Pat. publication No. 8987/70 a process for producing a thermoplastic resin having excellent resistance to both weathering and impact by graft-copolymerizing styrene, acrylonitrile and the like, on a copolymer of tricyclodecenyl acrylate or tricyclodecenyl methacrylate with an alkyl acrylate.

The present inventors continued research on said graft copolymer and found that when the thermoplastic resin obtained by graft-copolymerizing styrene and acrylonitrile on a copolymer of tricyclodecenyl acrylate or tricyclodecenyl methacrylate with an alkyl acrylate is injection-molded, most of the resulting molded articles have, on their surfaces, wave-like marks that reduce their commercial value (such marks being hereinafter referred to as flow marks).

The object of the present invention is to provide a process for producing a thermoplastic resin capable of forming molded articles having very few flow marks and an enhanced impact resistance.

As a result of further efforts to reduce the flow marks, the present inventors found that a thermoplastic resin capable of forming molded articles having markedly reduced flow marks can be produced by polymerizing tricyclodecenyl acrylate or tricyclodecenyl methacrylate with an alkyl acrylate such as butyl acrylate in an aqueous emulsion, and then, graft-copolymerizing, in the presence of the resulting copolymer emulsion, a monomer mixture comprising 30 to 60 percent by weight of methyl methacrylate, 60 to 30 percent by weight of styrene and 8 to 21 percent by weight of acrylonitrile. However, when methyl methacrylate was thus introduced into the polymer, the falling ball impact strength of the molded articles is decreased with an increase of the amount of methyl methacrylate used. Therefore, a further improvement was required from a practical point of view. As a result of additional studies the present inventors have succeeded in said improvement.

According to the present invention, there is provided a process for producing thermoplastic resins capable of forming molded articles having very few flow marks and high falling ball impact resistance, which comprises polymerizing (I) 1 to 30 percent by weight of tricyclodecenyl acrylate, i.e., tricyclo [5.2.1.0$^{2,6}$]dec-3-en-8(or -9)-gl acrylate, or tricyclodecenyl methacrylate, i.e., tricyclo [5.2.1.0$^{2,6}$]dec-3-en-8(or 9) methacrylate, (II) 50 to 99 percent by weight of at least one alkyl acrylate in which the alkyl group has one to 13 carbon atoms, and (III) 0 to 20 percent by weight of at least one vinyl compound copolymerizable with said alkyl acrylate (II), in an aqueous emulsion to form a copolymer (A), then radical-polymerizing in the presence of 50 to 90 percent by weight (on solid basis) of the thus obtained aqueous copolymer (A) emulsion, 50 to 10 percent by weight of a monomer mixture (B) comprising 0 to 60 percent by weight of methyl methacrylate, 25 to 80 percent by weight of an aromatic vinyl monomer, 6 to 30 percent by weight of acrylonitrile and 1 to 10 percent by weight of at least one monomer selected from the group consisting of tricyclodecenyl acrylate, tricyclodecenyl methacrylate and non-conjugated divinyl compounds, to form a pre-graft-copolymer (C), and subsequently subjecting to graft-copolymerization 10 to 40 percent by weight (on solid basis) of the thus formed aqueous pre-graft-copolymer (C) emulsion and 90 to 60 percent by weight of a monomer mixture (D) comprising 30 to 60 percent by weight of methyl methacrylate, 60 to 30 percent by weight of an aromatic vinyl monomer and 8 to 21 percent by weight of acrylonitrile, in the presence of a radical-polymerization initiator and a partially saponified polyvinyl alcohol in an amount sufficient to convert the emulsion into a suspension in the course of polymerization.

The tricyclodecenyl acrylate or tricyclodecenyl methacrylate (I) for use in this invention is a compound obtained by reacting dicyclopentadiene with acrylic acid or methacrylic acid in the presence of a catalyst such as BF$_3$, the structural formula of said compound being assumed to be as follows:

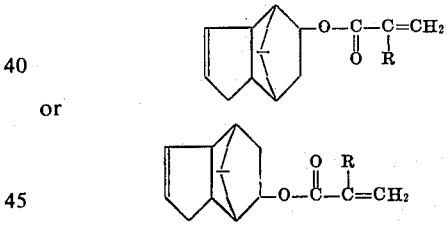

wherein R is H or CH$_3$.

The vinyl compound (III) copolymerizable with component (II) used in this invention includes, for example, styrene, α-methylstyrene, acrylonitrile, methacrylonitrile, alkyl vinyl ethers, such as n-butyl vinyl ether, acrylic acid, methacrylic acid, alkyl acrylates, such as methyl acrylate and ethyl acrylate, alkyl methacrylates, such as methyl methacrylate and ethyl acrylate, acrylamide and methacrylamide.

The aromatic vinyl monomers used in this invention include styrene, α-methylstyrene, α-ethylstyrene, and derivatives of these compounds having substituents on the nucleus such as, for example, vinyltoluene, chlorostyrene, and the like.

In this invention, the non-conjugated divinyl compound is selected from divinyl compounds such as divinylbenzene; diol esters of unsaturated acids such as ethylene glycol diacrylate and ethylene glycol dimethacrylate; esters of unsaturated alcohol with unsaturated acids such as allyl acrylate and allyl methacrylate; and esters of unsaturated alcohol with polybasic acids such as diallyl phthalate and triallyl cyanurate.

The polymerization initiators useful in the preparation of copolymer (A) include initiators for ordinary emulsion polymerizations such as, for example, persulfates, a redox initiator composed of cumene hydroperoxide and sodium formaldehyde sulfoxylate and the like. As the emulsifier, anionic emulsifiers such as sodium oleate are used, though nonionic emulsifiers may be used in combination with the anionic emulsifiers. In preparing the copolymer (A), it is more preferable in polymerization temperature control, particle size control and reduction of amount of agglomerate than charging the whole amount of the emulsifier or the monomer at once, to charge at the start of polymerization a portion of the emulsifier or the monomer and continue the polymerization while continuously or portionwise adding the remaining emulsifier or monomer according to the progress of polymerization.

The temperature to be maintained during the polymerization reaction may vary depending upon the kind of polymerization initiator used, and there are suitable temperature ranges for the respective initiators, though preferably 30° – 60°C.

According to circumstances, the use of a pH regulating agent and anti-foaming agent should be taken into account.

In preparing the pre-graft-copolymer (C), a chain transfer agent such as tert-dodecyl mercaptan should not be used. Also, consideration should preferably be given so that the polymerization may be initiated after the copolymer (A) has sufficiently been swollen with the monomer mixture used. It is undesirable that significant amounts of the tricyclodecenyl acrylate, the tricyclodecenyl methacrylate and the non-conjugated divinyl compound remains unpolymerized after termination of the polymerization. Therefore, consideration should be given to the proper selection of polymerization initiator, polymerization temperature, and polymerization time so as to increase the conversion as much as possible.

The polymerization temperature is desirably higher than that in the production of the copolymer (A) and preferably within the range of 60° to 90°C.

In the final polymerization step, a chain transfer agent such as tert-dodecyl mercaptan is preferably used in an amount of, ordinarily, 1 percent or less based on the monomer. As for the radical-polymerization initiator, it is preferable to freshly add a persulfate or a redox-type initiator such as a combination of cumen hydroperoxide and sodium formaldehyde sulfoxylate. It is also possible to use the above-said initiators in combination with an oil-soluble polymerization initiator such as lauroyl peroxide, benzoyl peroxide, azobisisobutyronitrile or the like.

The polymerization temperature is preferably higher than 60°C, though may suitably be selected depending upon the kind of polymerization initiator used.

The partially saponified polyvinyl alcohol to be used for the purpose of smoothly converting the emulsion phase into a suspension phase in the course of polymerization has preferably a polymerization degree of 1,000 to 2,000 and a saponification degree of 80 to 90 percent. However, there is no strict limit to these ranges, and they should suitably be chosen according to the kind and amount of the emulsifier used. Also, before starting polymerization, the reactant mixture can be treated by means of "T.K. Homomixer" (made by Tokushu Kika Kogyo Co., Ltd.)

The polymerization in this step proceeds in the form of an emulsion polymerization at the early stage. As the polymerization proceeds further on, the aggregation of particles takes place, and when the polymerization conversion exceeds about 60 percent, the viscosity of the polymerization system increases more and more and smooth agitation becomes increasingly difficult. At such a stage, deionized water alone or that containing dissolved therein up to 0.5 percent by weight of partially saponified polyvinyl alcohol is added to the system to convert the polymerization system to a suspension state without trouble such as formation of a sticky mass, whereby the subsequent polymerization can be carried out with smooth agitation.

Since the resulting resin is in the form of easily filterable small particles, no salting-out procedure as used in an ordinary emulsion polymerization is necessary in this case.

The present invention is further explained in detail with reference to the following examples, which are presented merely by way of illustration and not by way of limitation. In the examples, all parts and percentages are by weight, unless otherwise specified.

EXAMPLE 1

Recipe:

| | |
|---|---|
| Component I | |
| Ferrous sulfate heptahydrate | 0.0006 part |
| Disodium ethylenediamine tetraacetate dihydrate | 0.0012 part |
| Sodium formaldehyde sulfoxylate | 1.5 part |
| Sodium oleate | 6.0 part |
| Deionized water | 720.0 part |
| Component II | |
| Butyl acrylate | 294.0 parts |
| Tricyclodecenyl methacrylate | 6.0 parts |
| Cumene hydroperoxide | 0.5 parts |
| Component III | |
| Styrene | 45.0 parts |
| Acrylonitrile | 15.0 parts |
| Tricyclodecenyl methacrylate | 1.2 parts |
| Component IV | |
| Partially saponified polyvinyl alcohol (KH–17, Nippon Gosei Kagaku Co., Ltd.) | 2.2 parts |
| Sodium formaldehyde sulfoxylate | 0.5 parts |
| Deionized water | 520.0 parts |
| Component V | |
| Methyl methacrylate | 142.0 parts |
| Styrene | 143.0 parts |
| Acrylonitrile | 71.0 parts |
| Lauroyl peroxide | 0.5 parts |
| tert-Dodecyl mercaptan | 1.45 parts |
| Cumene hydroperoxide | 0.71 parts |
| Component VI | |
| Partially saponified polyvinyl alcohol (KH–17) | 1.0 part |
| Deionized water percent, 499.0 parts | |

Polymerization procedure

Component I was charged into a reactor, and after the air in the reactor was replaced by nitrogen, 10 percent i.e. 30.0 parts, of component II was added thereto with stirring, after which the temperature of the mixture was elevated to 50°C. After most of the monomer initially charged had been polymerized, the remainder of component II was continuously charged over a period of 5 hours while the polymerization temperature was controlled at 50°C to polymerize the monomer. After completion of the addition of component II, the mixture was kept at 50°C for 2 hours to substantially complete the polymerization. The resulting rubber-like resin is hereinafter referred to as copolymer (A). After the reactor was cooled to a temperature below 30°C, component III was added thereto, and the resulting mixture was stirred for one hour while the temperature was adjusted so as not to exceed 30°C by cooling. After the lapse of 1 hour, the mixture was heated to 70°C, and as soon as the temperature reached 70°C, 0.2 part of cumene hydroperoxide was added dropwise, and the temperature was kept at 70°C for 3 hours to effect polymerization, after which the mixture was cooled to obtain a latex of a pre-graft-copolymer (C).

Into another reactor were charged components IV and V, and the air in the reactor was replaced by nitrogen with stirring. The latex of pre-graft-copolymer (C) in an amount corresponding to 120.0 parts of copolymer (A) contained therein was slowly added to the reactor, and the mixture was stirred at room temperature for 1 hour, after which the temperature was raised to 70°C. After 6 hours of stirring at 70°C, the viscosity of the polymerization mixture increased so that smooth stirring became difficult. At this stage, component VI was added to the mixture to decrease the viscosity, and consequently, restore the smooth stirring. The temperature which had been lowered below 60°C was elevated to 80°C, and polymerization was allowed to proceed at this temperature for 5 hours. The resulting slurry was filtered, dehydrated, washed with water and then dried. The dried powder was extruded from an extruder and pelletized. The resin thus obtained was injection-molded to obtain test pieces having a size of 2 × 40 × 120 mm.

The surface of the test pieces was inspected for flow marks, and the falling ball impact strength of the test piece was determined by means of a Du Pont falling ball impact tester. The impact strength at a breakage of 50 percent was taken as the falling ball impact strength.

REFERENTIAL EXAMPLE 1

In the same manner as in Example 1, test pieces were obtained except that component III was composed of 45.0 parts of styrene and 15.0 parts of acrylonitrile.

The results obtained in Example 1 and Referential Example 1 were as shown in Table 1.

TABLE 1

| Item<br>Test piece | Amount of tricyclo-decenyl methacrylate in component III (%) | Flow mark | Falling ball impact strength (kg-cm) |
| --- | --- | --- | --- |
| Example 1 | 1.96 | No. | 50< |
| Referential Example 1 | 0.0 | No | 16 |

EXAMPLE 2

The same procedure as in Example 1 was repeated to obtain test pieces, except that the composition of component III was changed as follows:

| | |
| --- | --- |
| Methyl methacrylate | 24.0 parts |
| Styrene | 24.0 parts |
| Acrylonitrile | 12.0 parts |
| Tricyclodecenyl methacrylate | 1.2 parts |

REFERENTIAL EXAMPLE 2

The same procedure as in Example 1 was repeated to obtain test pieces, except that the composition of component III was changed as follows:

| | |
| --- | --- |
| Methyl methacrylate | 24.0 parts |
| Styrene | 24.0 parts |
| Acrylonitrile | 12.0 parts |

REFERENTIAL EXAMPLE 3

The same procedure as in Example 1 was repeated, except that the pre-graft-polymerization by use of component III was omitted and the composition of component V was changed as follows:

| | |
| --- | --- |
| Methyl methacrylate | 152.0 parts |
| Styrene | 152.0 parts |
| Acrylonitrile | 76.0 parts |
| Lauroyl peroxide | 0.5 parts |
| Cumene hydroperoxide | 0.76 parts |
| tert-Dodecyl mercaptan | 1.45 parts |

The results obtained in Example 2 and Referential Examples 2 and 3 were as shown in Table 2.

TABLE 2

| Item<br>Test piece | Pre-graft-polymerization using component III | Amount of tricyclo-decenyl methacrylate in component III (%) | Flow mark | Falling ball impact strength (kg-cm) |
| --- | --- | --- | --- | --- |
| Example 2 | Yes | 1.96 | No | 50< |
| Referential Example 2 | Yes | 0.0 | No. | 14 |
| Referential Example 3 | No. | — | No. | 13 |

EXAMPLE 3

Example 1 was repeated, except that the composition of component V was as follows:

| | |
| --- | --- |
| Methyl methacrylate | 142.0 parts |
| Styrene | 164.0 parts |
| Acrylonitrile | 50.0 parts |
| Lauroyl peroxide | 0.5 parts |
| Cumene hydroperoxide | 0.71 parts |
| tert-Dodecyl mercaptan | 1.45 part |

REFERENTIAL EXAMPLE 4

The procedure of Example 3 was repeated, except that component V was changed to the following composition:

| | |
| --- | --- |
| Styrene | 267.0 parts |
| Acrylonitrile | 89.0 parts |
| Lauroyl peroxide | 0.5 parts |
| Cumene hydroperoxide | 0.71 parts |
| tert-Dodecyl mercaptan | 1.45 parts |

REFERENTIAL EXAMPLE 5

The same procedure as in Example 3 was repeated except that the component V was changed as follows:

| | |
| --- | --- |
| Styrene | 285.0 parts |
| Acrylonitrile | 95.0 parts |
| Lauroyl peroxide | 0.5 parts |
| Cumene hydroperoxide | 0.76 parts |
| tert-Dodecyl mercaptan | 1.45 parts |

The results obtained in Example 3 and Referential Examples 4 and 5 were as shown in Table 3.

TABLE 3

| Item<br>Test piece | Pre-graft-polymerization using component III | Amount of methyl methacrylate in component III (%) | Flow mark | Falling ball impact strength (kg-cm) |
|---|---|---|---|---|
| Example 3 | Yes | 40 | No. | 50< |
| Referential Example 4 | Yes | 0 | Yes | 50< |
| Referential Example 5 | No. | 0 | Yes | 30 |

EXAMPLE 4

For the component III in Example 1 were substituted the following:

| Styrene | 45.0 parts |
| Acrylonitrile | 15.0 " |
| Tricyclodecenyl methacrylate | 2.4 " |

EXAMPLE 5

For the component II in Example 1 were substituted the following:

| Butyl acrylate | 285.0 parts |
| Tricyclodecenyl methacrylate | 15.0 " |
| Cumene hydroperoxide | 0.5 " |

REFERENTIAL EXAMPLE 6

For the component III in Example 5 were substituted the following:

| Styrene | 45.0 parts |
| Acrylonitrile | 15.0 parts |

The results obtained in Examples 4 and 5 and Referential Example 6 were as shown in Table 4.

TABLE 4

| Item<br>Test piece | Amount of tricyclodecenyl methacrylate in component II (%) | Amount of tricyclodecenyl methacrylate in component III (%) | Flow Mark | Falling ball impact strength (kg-cm) |
|---|---|---|---|---|
| Example 4 | 2.0 | 3.85 | No | 50< |
| Example 5 | 5.0 | 1.96 | No | 50< |
| Referential Example 6 | 5.0 | 0.0 | Observed | 16 |

EXAMPLE 6

The following were substituted for the component II in Example 1:

| Butyl acrylate | 294.0 parts |
| Tricyclodecenyl acrylate | 6.0 parts |
| Cumene hydroperoxide | 0.5 parts |

EXAMPLE 7

The following were substituted for the component III in Example 6:

| Styrene | 45.0 parts |
| Acrylonitrile | 15.0 parts |
| Tricyclodecenyl acrylate | 1.2 parts |

The results obtained in Examples 6 and 7 were as shown in Table 5.

TABLE 5

| Item<br>Test piece | Component II | Component III | Flow mark | Falling ball impact strength (kg-cm) |
|---|---|---|---|---|
| Example 6 | Tricyclodecenyl acrylate 2.0 % | Tricyclodecenyl methacrylate 1.96%% | No | 50< |
| Example 7 | Tricyclodecenyl acrylate 2.0 % | Tricyclodecenyl acrylate 1.96% | No | 50< |

What is claimed is:

1. A process for producing an impact resistant, thermoplastic resin having few flow marks, which comprises (1) polymerizing (I) 1 to 30 percent by weight of tricyclodecenyl acrylate or tricyclodecenyl methacrylate, (II) 50 to 99 percent by weight of at least one alkyl acrylate in which the alkyl group has one to 13 carbon atoms and (III) 0 to 20 percent by weight of at least one vinyl compound copolymerizable with said alkyl acrylate (II), in an aqueous emulsion to form a copolymer (A), then (2) radical-polymerizing, in the presence of 50 to 90 percent by weight, on solid basis, of the resulting aqueous copolymer (A) emulsion, 50 to 10 percent by weight of a monomer mixture (B) comprising 0 to 60% by weight of methyl methacrylate, 25 to 80 percent by weight of an aromatic vinyl monomer, 6 to 30 percent by weight of acrylonitrile and 1 to 10 percent by weight of at least one monomer selected from the group consisting of tricyclodecenyl acrylate, tricyclodecenyl methacrylate and non-conjugated divinyl compounds, to form a pregraft-copolymer (C), (3) subsequently subjecting to graft-copolymerization 10 to 40 percent by weight, on solid basis, of the thus obtained aqueous pregraft-copolymer (C) emulsion and 90 to 60 percent by weight of a monomer mixture (D) comprising 30 to 60 percent by weight of methyl methacrylate, 60 to 30 percent by weight of an aromatic vinyl monomer and 8 to 21% by weight of acrylonitrile, in the presence of a radical-copolymerization initiator and (4) adding during such graft-copolymerization a partially saponified polyvinyl alcohol in an amount sufficient to convert the emulsion to a suspension in the course of the polymerization.

2. A process according to claim 1, wherein the component (III) is selected from the group consisting of styrene, α-methylstyrene, acrylonitrile, methacrylonitrile, alkyl vinyl ethers, acrylic acid, methacrylic acid, alkyl acrylates, alkyl methacrylates, acrylamide and methacrylamide.

3. A process according to claim 1, wherein the aromatic vinyl monomer is selected from the group consisting of styrene, α-methylstyrene, α-ethylstyrene, vinyl toluene and chlorostyrene.

4. A process according to claim 1, wherein the non-conjugated divinyl compound is selected from the group consisting of divinylbenzene, ethylene glycol diacrylate, ethylene glycol dimethacrylate, allyl acrylate, allyl methacrylate, diallyl phthalate and triallyl cyanurate.

5. A process according to claim 1, wherein the copolymer (A) is formed in the presence of a polymerization initiator of the redox type.

6. A process according to claim 1, wherein the graft-copolymerization of the monomer mixture (D) on the pre-graft-copolymer (C) is effected in the presence of a chain transfer agent.

7. A process according to claim 6, wherein the amount of the chain transfer agent is 1 percent by weight or less based on the weight of component (D).

8. A process according to claim 6, wherein the chain transfer agent is tert-dodecyl mercaptan.

9. A process according to claim 1, wherein the partially saponified polyvinyl alcohol has a polymerization degree of 1,000 to 2,000 and a saponification degree of 80 to 90 percent.

10. An impact resistant, thermoplastic resin obtained according to the process of claim 1.

11. A process according to claim 1, wherein said partially saponified polyvinyl alcohol is added when the viscosity of the emulsion during the graft-copolymerization has increased such that smooth agitation becomes difficult.

12. A process according to claim 11, wherein the polyvinyl alcohol is added when the polymerization conversion exceeds about 60%.

13. A process according to claim 1, wherein, the tricyclo-decenyl acrylate or tricyclodecenyl methacrylate have the formula:

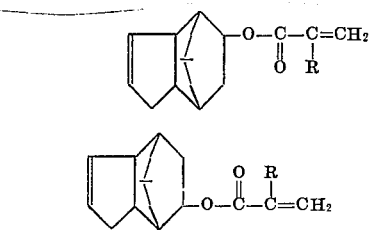

wherein R is H or $CH_3$.

14. A process according to claim 1, wherein, the tricyclodecenyl acrylate is tricyclo[$5.2.1.0^{2,6}$]dec-3-en-8(or -9)-yl acrylate and the tricyclodecenyl methacrylate is tricyclo[$5.2.1.0^{2,6}$]dec-3-en-8(or -9)-yl methacrylate.

* * * * *